United States Patent
Inoue et al.

(10) Patent No.: US 8,752,278 B2
(45) Date of Patent: Jun. 17, 2014

(54) METHOD OF RECLAIMING A HEAD SUSPENSION FROM A HEAD GIMBAL ASSEMBLY

(75) Inventors: Masaru Inoue, Aikoh-gun (JP); Sei Kawao, Aikoh-gun (JP); Takeshi Shimoda, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 19 days.

(21) Appl. No.: 12/454,405

(22) Filed: May 18, 2009

(65) Prior Publication Data

US 2009/0303636 A1    Dec. 10, 2009

(30) Foreign Application Priority Data

Jun. 9, 2008 (JP) ................... 2008-150790

(51) Int. Cl.
*G11B 5/127* (2006.01)
*H04R 31/00* (2006.01)

(52) U.S. Cl.
USPC .......... 29/603.02; 29/603.03; 29/603.04; 29/603.07; 360/245.3

(58) Field of Classification Search
USPC ........... 29/603.03, 603.04, 603.06, 603.07, 29/603.12; 360/245.3
See application file for complete search history.

(56) References Cited

U.S. PATENT DOCUMENTS

| | | | |
|---|---|---|---|
| 5,213,675 A * | 5/1993 | Yamaguchi et al. | 204/418 |
| 6,564,988 B1 * | 5/2003 | Shiraishi et al. | 228/110.1 |
| 6,790,289 B2 * | 9/2004 | Takase et al. | 134/1 |
| 2003/0005564 A1 * | 1/2003 | Wong et al. | 29/426.4 |
| 2007/0274006 A1 * | 11/2007 | Yamaguchi et al. | 360/264 |

FOREIGN PATENT DOCUMENTS

| | | | |
|---|---|---|---|
| CN | 1033464 | | 4/1996 |
| CN | 1430779 | | 7/2003 |
| JP | 55120958 A | * | 9/1980 |
| JP | 05-339557 | | 12/1993 |
| JP | 09-191029 | | 7/1997 |
| JP | 2002-093092 | | 3/2002 |
| JP | 2002-177906 | | 6/2002 |
| JP | 2003-147306 | | 5/2003 |
| JP | 2004300364 A | * | 10/2004 |
| JP | 2005-044399 | | 2/2005 |
| JP | 2005-132854 | | 5/2005 |

* cited by examiner

*Primary Examiner* — Paul D Kim
(74) *Attorney, Agent, or Firm* — Jordan and Hamburg LLP

(57) ABSTRACT

A method of reclaiming a head suspension includes detaching a slider 225 from a tongue 221 of the head suspension and removing an adhesive 227 remaining on the tongue 221. Removing the adhesive 227 remaining on the tongue 221 includes feeding a solvent 243, which promotes the removal of the adhesive 227, to a part of the tongue 221 where the adhesive 227 remains and promoting the removal of the remaining adhesive 227 from the tongue 221 by applying physical energy to the adhesive remaining part on the tongue 221. The physical energy is produced by heating, supersonic vibration, and the like. The method easily removes the adhesive 227 from the tongue 221 without directly applying mechanical force to the tongue 221, thereby improving yields.

12 Claims, 9 Drawing Sheets

(A)

(B)

Completion of reclaiming head suspension (A)

(B)

METHOD OF RECLAIMING A HEAD SUSPENSION FROM A HEAD GIMBAL ASSEMBLY

BACKGROUND OF THE INVENTION

1. Field of the Invention

The present invention relates to a head suspension having a tongue to which a slider provided with a magnetic head is attached to write and read data to and from a magnetic disk in a hard disk drive (HDD). In particular, the present invention relates to a method of reclaiming the head suspension, a method of manufacturing the head suspension, and a method of reclaiming a work, capable of greatly improving yields.

2. Description of Related Art

FIG. 1 illustrates a head suspension 101 used to write and read data to and from a magnetic disk in a hard disk drive installed in, for example, a personal computer.

The head suspension 101 includes a base plate 102, a load beam 103 fixed to the base plate 102, and a flexure 105. The flexure 105 is made of a flexible metal thin plate and is fixed to the load beam 103 by, for example, spot welding.

The flexure 105 has a tongue 106 to which a slider 107 is attached with an adhesive 111 (FIG. 2A). The slider 107 has a write/read magnetic head (magnetoelectric converting element). The head suspension 101 provided with the slider 107 is called a head gimbal assembly (HGA).

In the head gimbal assembly, the load beam 103 produces resilient force that is balanced with hydrodynamic force generated between the slider 107 and the magnetic disk, so that the slider 107 floats above the surface of the magnetic disk by an infinitesimal distance and is positioned to a track on the magnetic disk.

The surface of the flexure 105 is provided with a flexible wiring substrate 109 (FIG. 2A) that electrically connects the slider 107 to a circuitry of the hard disk drive. The slider 107 is electrically connected to the flexible wiring substrate 109 with a gold ball bonding 112 as illustrated in FIG. 2A.

The head gimbal assembly is tested for its performance and characteristics before shipment, and if passes the test, is shipped as a product. If the head gimbal assembly fails the test due to some problem of the slider 107, the defective slider 107 is detached from the flexure 105 to reclaim the head suspension 101 and a new slider 107 is attached to the flexure 105 to restore the head gimbal assembly. The adhesive 111 used to fix the slider 107 to the flexure 105 is generally a thermosetting adhesive.

When detaching the slider 107 (FIG. 2A) from the tongue 106 of the flexure 105 fixed to the load beam 103, the flexure 105 easily deforms because the flexure 105 is thin and brittle compared with the load beam 103. In addition, there is a risk of detaching, together with the slider 107, the flexible wiring substrate 109 attached to the flexure 105. To avoid this, a related art such as Japanese Unexamined Patent Application Publication No. 2005-44399 heats an area around the slider 107 to weaken the strength of the adhesive 111, and them, detaches the slider 107 from the tongue 106 of the flexure 105.

The related art, however, is incapable of clearly removing the adhesive 111 with the slider 107 and frequently leaves at least part of the adhesive 111 on the flexure 105 as illustrated in FIG. 2B. The adhesive 111 remaining on the flexure 105 prevents a new slider 107 from firmly being fixed to the flexure 105. The residual adhesive 111 must clearly be removed from the flexure 105. For this, the related art achieves a residual adhesive removing process. This process applies a solvent to the part of the flexure 105 where the residual adhesive is present and manually scrapes off the residual adhesive with a removing jig 113 as illustrated in FIG. 3.

The residual adhesive removing process involving the manual work may damage or deform the head suspension and change the load balance thereof depending on the skill of a person who conducts the residual adhesive removing process. In addition, the process takes a long time and deteriorates yields.

SUMMARY OF THE INVENTION

An object of the present invention is to provide a method of reclaiming a head suspension, a method of manufacturing a head suspension, and a method of reclaiming a work, capable of improving yields.

In order to accomplish the object, an aspect of the present invention provides a method of reclaiming a head suspension from a head gimbal assembly, the head gimbal assembly including the head suspension and a slider, the slider including a read/write magnetic head and being attached with an adhesive to a tongue of the head suspension. The method includes detaching the slider from the tongue of the head suspension and removing the adhesive remaining on the tongue. Removing the adhesive remaining on the tongue is carried out by: feeding a solvent to a part of the tongue where the adhesive remains, the solvent being one that promotes the removal of the remaining adhesive from the tongue; and promoting the removal of the remaining adhesive from the tongue by applying physical energy to the adhesive remaining part on the tongue, the physical energy being produced by heating.

According to this aspect of the present invention, removing the adhesive remaining on the tongue includes feeding a solvent to a part of the tongue where the adhesive remains, the solvent being one that promotes the removal of the remaining adhesive from the tongue and promoting the removal of the remaining adhesive from the tongue by applying physical energy to the adhesive remaining part on the tongue, the physical energy being produced by heating. This aspect can easily remove the residual adhesive from the tongue of the head suspension without directly applying mechanical force to the tongue.

This aspect, therefore, poses no hazard such as flaws, deformation, and load variation on the head suspension to be reclaimed, shortens working hours, and improves yields.

BRIEF DESCRIPTION OF THE DRAWINGS

FIGS. 2A and 2B are views illustrating an adhesive left on the head suspension according to a related art, in which FIG. 2A illustrates a slider attached to a tongue of a flexure with an adhesive and FIG. 2B illustrates the adhesive left on the tongue;

FIGS. 7A and 7B are views illustrating a process of removing a residual adhesive according to an embodiment of the present invention, in which FIG. 7A illustrates a step of locally feeding a solvent with a sintered ceramic bar to a part of the tongue where the adhesive remains and FIG. 7B illustrates a step of promoting the removal of the remaining adhesive by applying physical energy (heat) to the tongue;

FIGS. 8A and 8B are views illustrating a process of removing a residual adhesive according to an embodiment of the present invention, in which FIG. 8A illustrates a step of locally feeding a solvent with a microdispenser to a part of the tongue where the adhesive remains and FIG. 8B illustrates a step of promoting the removal of the remaining adhesive by applying physical energy (heat) to the tongue.

DETAILED DESCRIPTION OF EMBODIMENTS

A method of reclaiming a head suspension, a method of manufacturing a head suspension, and a method of reclaiming a work according to embodiments of the present invention will be explained in detail with reference to the drawings.

First, a head suspension to be reclaimed according to the present invention will be explained with reference to FIGS. 4 and 5.

Figure 1:
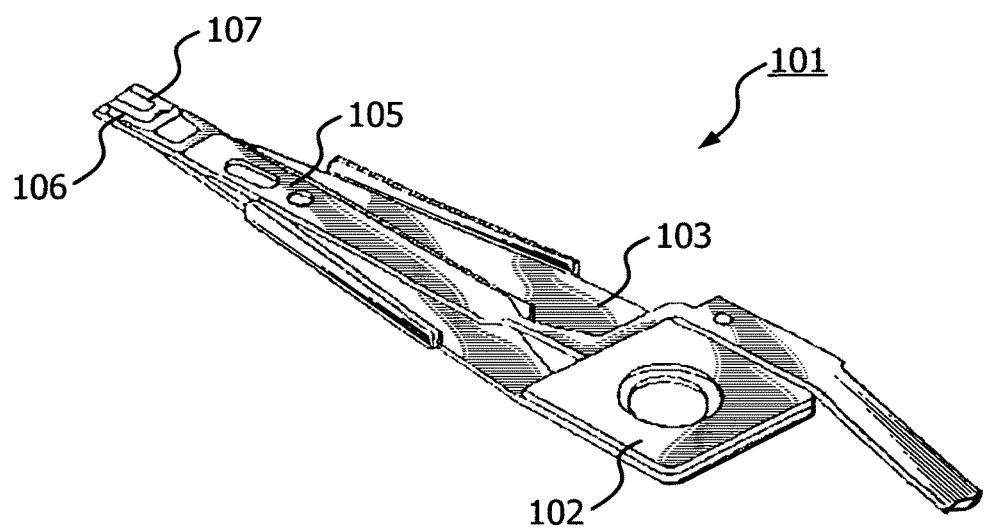
FIG. 1 is a perspective view illustrating a head suspension.
Figure 2:
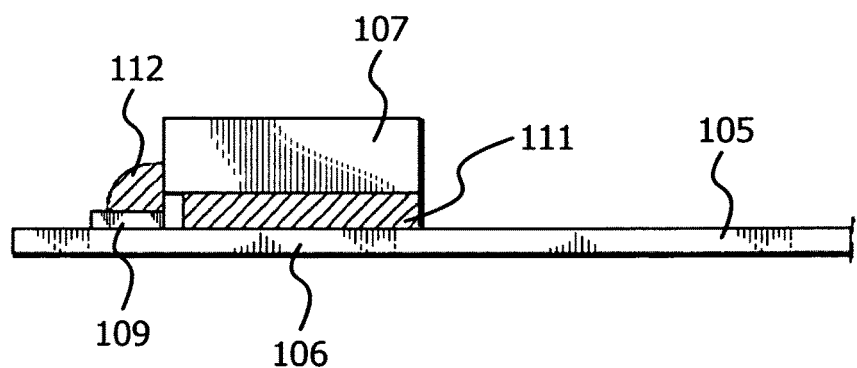
Figure 2:
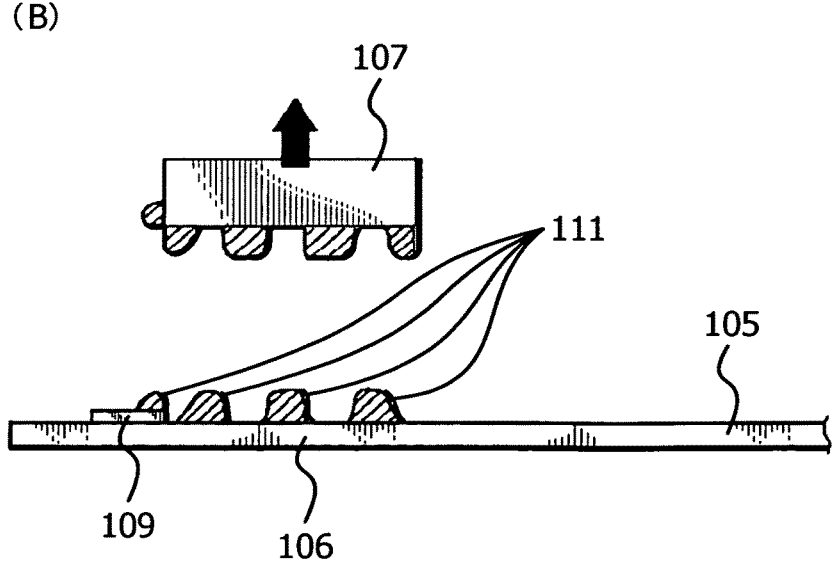
Figure 3:
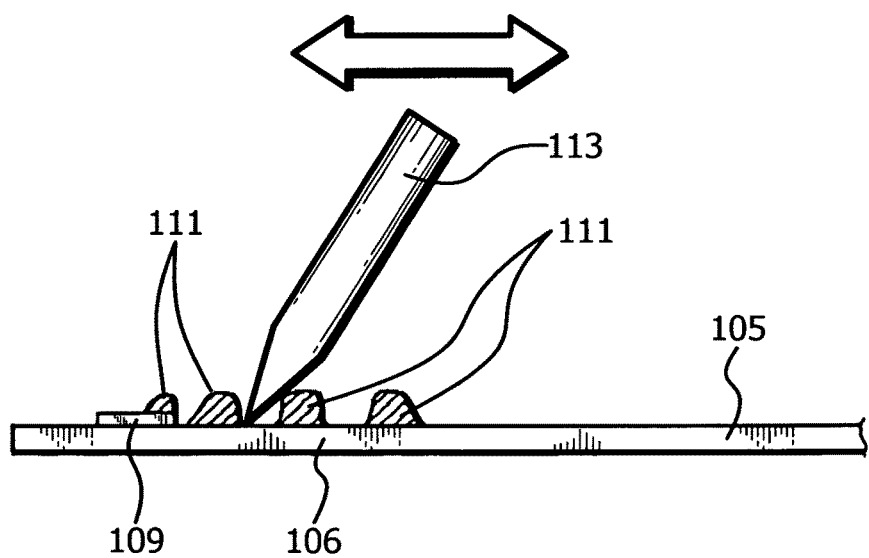
FIG. 3 is a view illustrating a technique of removing a residual adhesive according to a related art.
Figure 4:
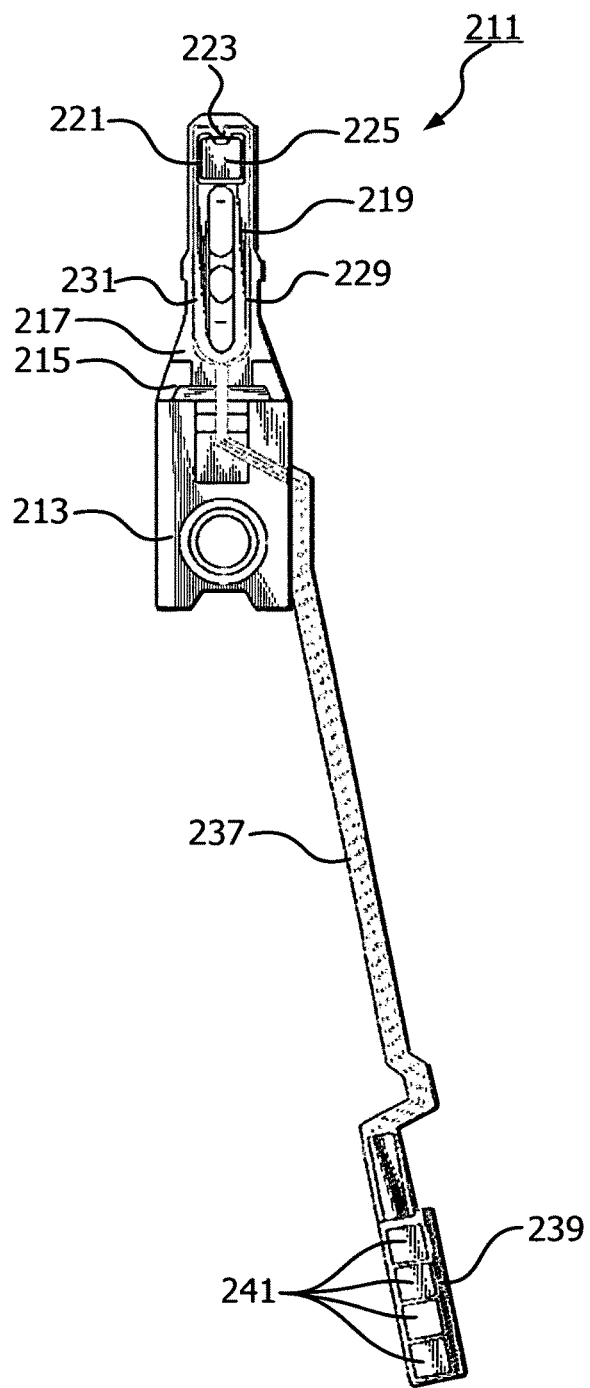
FIG. 4 is a view generally illustrating an example of a head suspension to be reclaimed according to an embodiment of the present invention.
Figure 5:
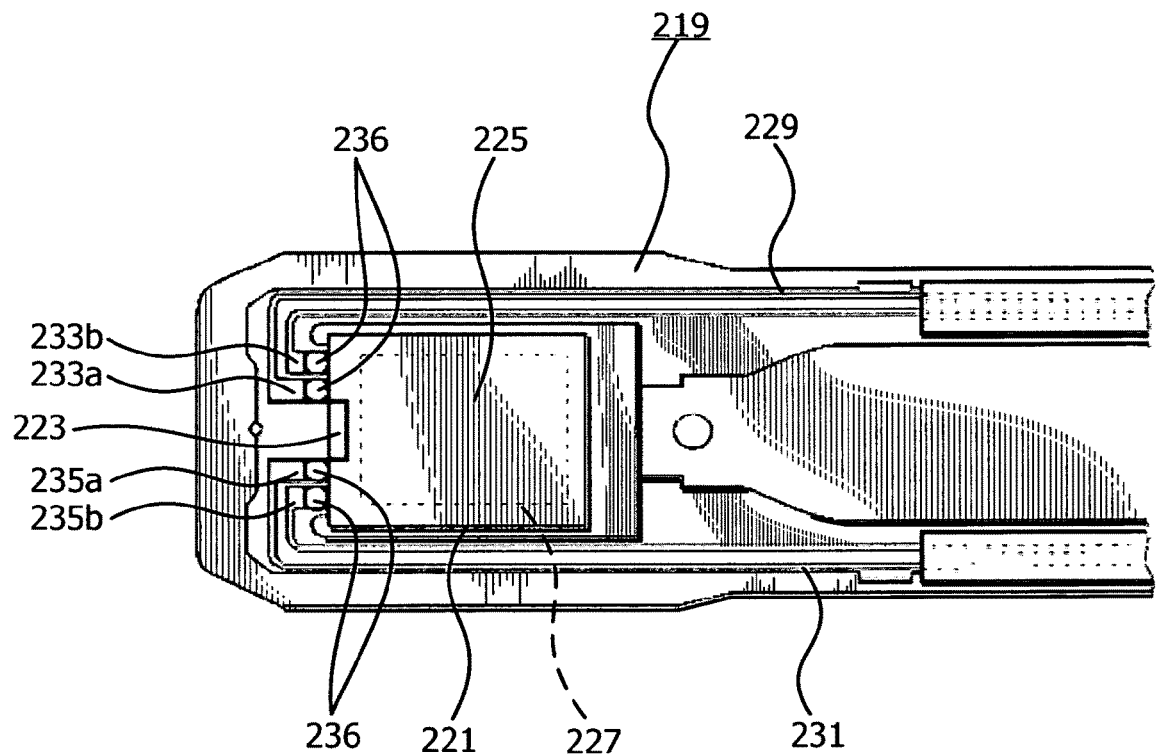
FIG. 5 is an enlarged view illustrating a tongue of the head suspension of FIG. 4 and the vicinity of the tongue.

In FIGS. 4 and 5, the head suspension 211 has a base plate 213, a load beam 217 fixed through a load bend 215 to the base plate 213, and a flexure 219 fixed to the load beam 217. The flexure 219 has a tongue 221 to which a slider 225 is attached with an adhesive 227 (illustrated with a dotted rectangle in FIG. 5). The slider 225 includes a write/read magnetic head 223. The head suspension 211 provided with the slider 225 is called a head gimbal assembly (HGA).

The load beam 217 is made of a precision thin plate spring and functions to apply load onto the magnetic head 223. The load beam 217 is preferably made of a metal plate such as an austenite-based stainless steel (for example, SUS304 or SUS305) plate having a thickness of about several tens of micrometers to about one hundred micrometers.

The flexure 219 is made of a flexible metal thin plate and is fixed to a front part of the load beam 217 by, for example, spot welding. The flexure 219 resiliently supports the slider 225 in a floating state with respect to the load beam 217. A front end of the flexure 219 is provided with four terminals 233a, 233b, 235a, and 235b to pass write and read signals to and from the magnetic head 223 of the slider 225. The surface of the flexure 219 is provided with flexible wiring substrates 229 and 231 to transmit the write and read signals to and from the magnetic head 223.

The slider 225 is electrically connected through, for example, gold ball bonding 236 to the terminals 233a, 233b, 235a, and 235b of the flexible wiring substrates 229 and 231. The flexible wiring substrates 229 and 231 include conductor patterns that start from the terminals 233a, 233b, 235a, and 235b, extend on each side of the slider 225 and along each side of the flexure 219, pass through a rear end of the flexure 219 and a relaying flexile wiring substrate 237, and reach four terminals 241 arranged at a base 239 of the flexure 219. When the head suspension 211 is installed in a magnetic disk drive or a hard disk drive (not illustrated), the terminals 241 are connected to a data processing circuit (not illustrated) of the magnetic disk drive.

The magnetic head 223 is a magnetoelectric converting element such as an MR element, a GMR element, and a TuMR element capable of converting electric and magnetic signals from one to another. The magnetic head 223 reads data out of a magnetic disk in the magnetic disk drive and converts the read data into an electric signal, which is transmitted through the relaying flexible wiring substrate 237 and the like to the data processing circuit of the magnetic disk drive. When writing data to the magnetic disk, the data processing circuit of the magnetic disk drive transmits an electric signal representing the write data through the relaying flexible wiring substrate 237 and the like to the magnetic head 223.

The adhesive 227 used to fix the slider 225 to the tongue 221 is mainly made of a resin material that forms a network structure when heated, such as epoxy-based resin, phenol-based resin, and urethane-based resin. The adhesive 227 may have a thermosetting characteristic as well as an ultraviolet setting characteristic. The adhesive having both the thermosetting characteristic and ultraviolet setting characteristic is mainly made of prepolymer or oligomer having a photopolymerizing characteristic and a characteristic of forming a network structure when heated, such as epoxyacrylate, urethaneacrylate, and unsaturated polyester.

The head suspension 211 illustrated in FIGS. 4 and 5 is only an example to which the present invention is applicable. The present invention is applicable to head suspensions having any other shapes.

Figure 6:
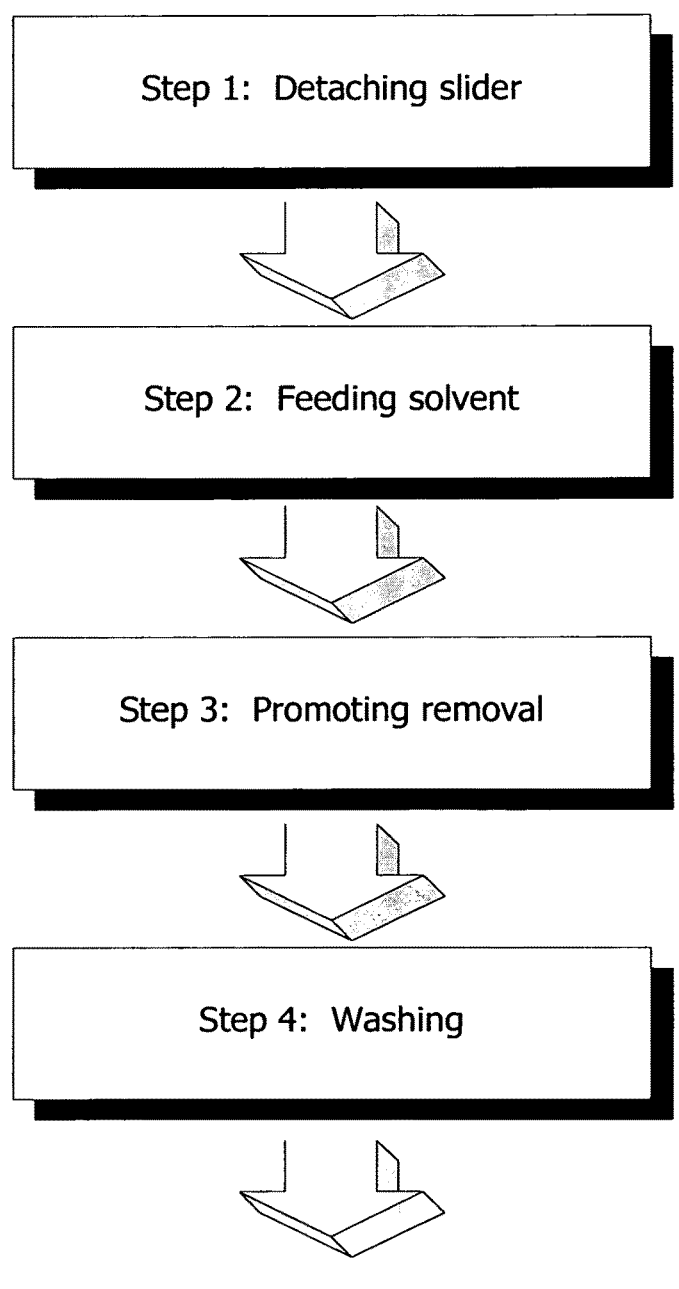
FIG. 6 is a flowchart illustrating a method of reclaiming a head suspension according to an embodiment of the present invention.

Now, a method of reclaiming a head suspension according to an embodiment of the present invention will be explained with reference to the flowchart of FIG. 6 based on the head suspension 211 illustrated in FIGS. 4 and 5. In FIG. 6, step 1 detaches the slider 225 having the write/read magnetic head 223 from the head gimbal assembly in which the slider 225 is attached to the tongue 221 of the head suspension 211 with the adhesive 227. Steps 2 to 4 form an adhesive removing process to remove the adhesive 227 remaining on the tongue 221 and reclaim the head suspension 211. In the adhesive removing process, the step 2 feeds a solvent (if the adhesive 227 is an epoxy-based adhesive, the solvent is preferably N-methyl-2-pyrrolidone (NMP)) to a part of the tongue 221 where the adhesive 227 remains. The step 3 promotes the removal of the adhesive 227 by applying physical energy to the adhesive remaining part. The physical energy may be produced by heating.

The step 1 of detaching the slider 225 from the head gimbal assembly may be carried out according to, for example, the above-mentioned related art of Japanese Unexamined Patent Application Publication No. 2005-44399. Namely, the adhesive 227 is heated from the flexure 219 side and is cooled from the slider 225 side. Thereafter, the slider 225 is detached from the flexure 219 with a jig (not illustrated). The present invention relates to removing adhesive remnants from the tongue 221 of the head suspension 211 and does not intend to propose a new slider detaching technique. Accordingly, the present invention may adopt any slider detaching technique.

The step 2 of feeding a solvent may be achieved by dipping at least the tongue 221 on which the adhesive 227 remains in a solvent 243 filled in a tank (not illustrated).

In this case, if the solvent 243 poses no hazard on the head suspension 211, not only the part of the tongue 221 where the adhesive 227 remains but also the whole of or a part of the head suspension 211 may be immersed in the solvent 243 in the tank.

Figure 7:
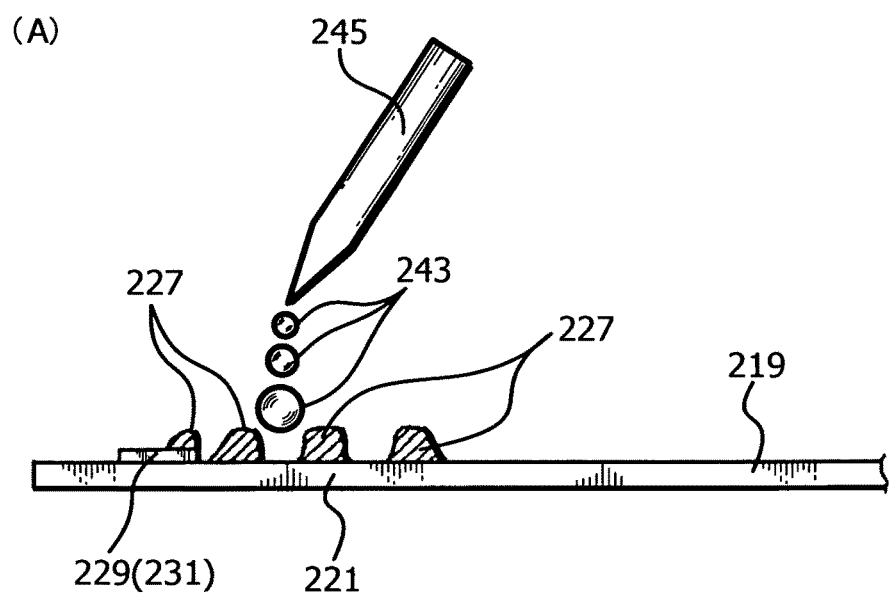
Figure 7:
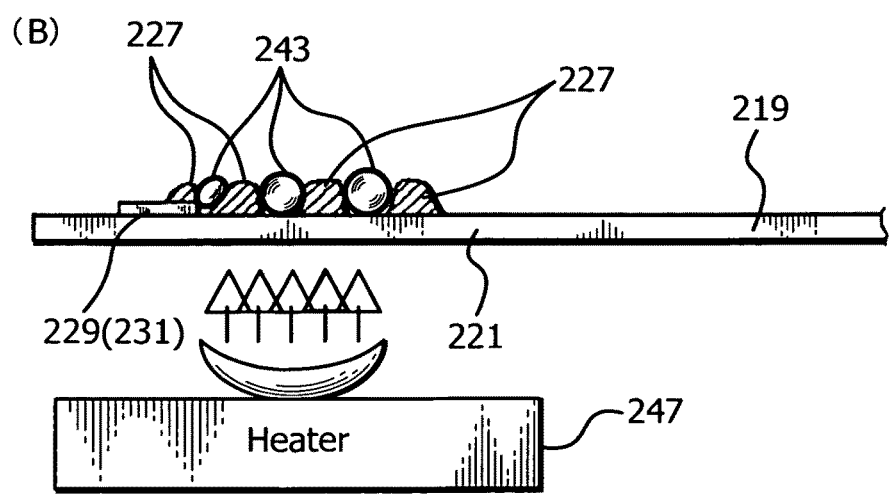
Figure 8:
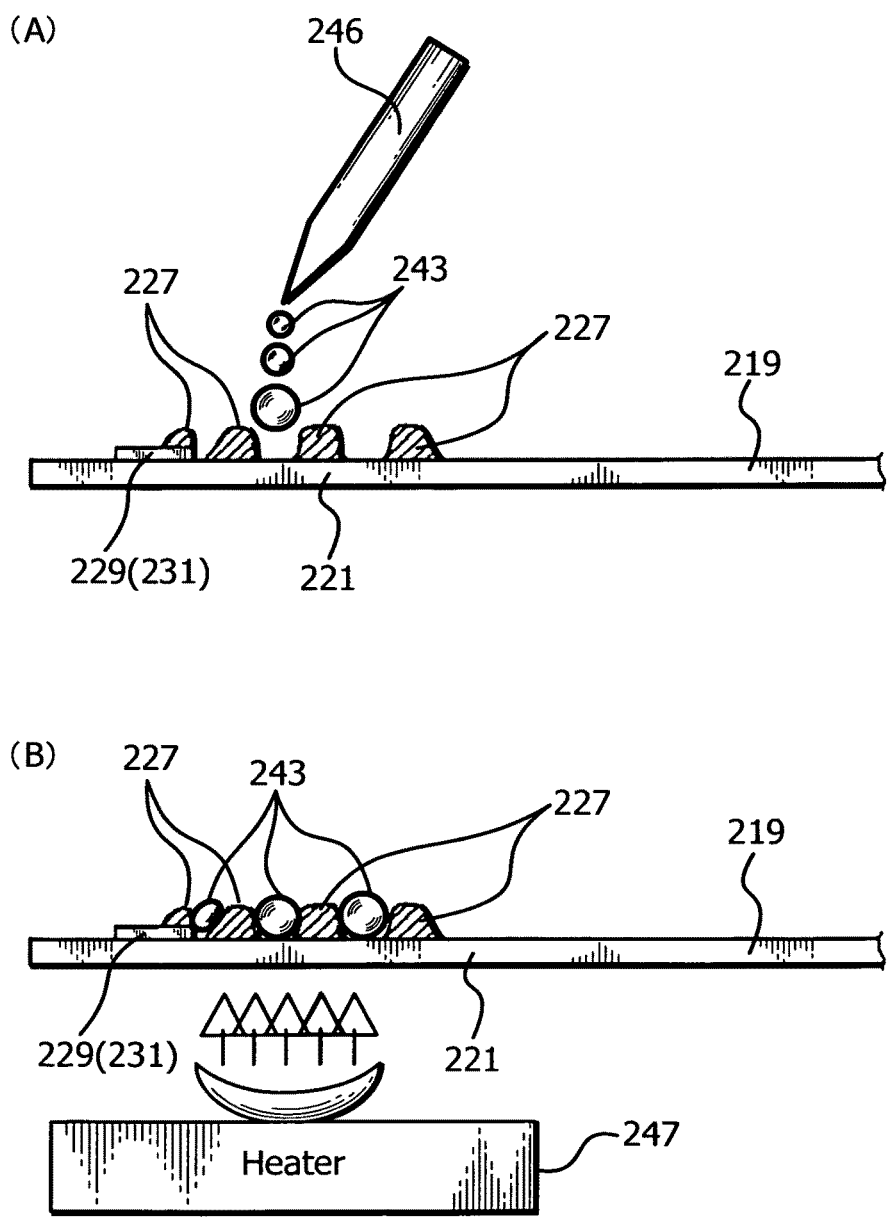

The solvent 243 is sometimes hazardous to the head suspension 211. For example, the solvent 243 may act to detach not only the adhesive 227 but also parts such as buffers from the head suspension 211. In this case, the solvent 243 may locally be applied or dropped with the use of, for example, a sintered ceramic bar 245 onto the part of the tongue 221 where the adhesive 227 is left as illustrated in FIG. 7A. The same may be carried out with the use of a microdispenser 246 as illustrated in FIG. 8A.

When feeding the solvent 243 to the adhesive remaining part on the tongue 221, the quantity of the solvent 243 is preferably selected to fully cover the contour of the adhesive remaining part. If the quantity of the solvent 243 is smaller than the quantity of the remnant adhesive, the removal of the adhesive 227 will be inadequate, and if it is excessive compared with the quantity of the remnant adhesive, the solvent 243 will spread around the adhesive remaining part to cause problems even if the adhesive 227 is cleared.

It is preferable, therefore, to feed the solvent 243 so that the solvent 243 may completely cover the contour of the adhesive remaining part on the tongue 221 and may spread slightly out of the contour of the adhesive remaining part. Then, the adhesive 227 will completely be removed without badly affecting the parts outside the adhesive remaining part.

The step 3 of promoting the removal of the adhesive 227 immerses at least the tongue 221 of the head suspension 211 in the solvent 243 filled in a tank (not illustrated) if the solvent 243 is not hazardous to the head suspension 211. Thereafter, the solvent 243 is heated, or supersonic vibration is applied to the tongue 221, or the heating and the application of supersonic vibration are combined. For example, the heating is carried out at a predetermined temperature (for example, 200 degrees centigrade) or lower for a predetermined time and the supersonic vibration is applied at a predetermined frequency.

Conducting the heating at a temperature below 200 degrees centigrade may protect the flexible wiring substrates 229 and 231 and the like that are generally made of polyimide material from deteriorating or carbonizing. The heating time may properly be determined through tests so that the residual adhesive 227 may easily be cleaned off.

Instead of dipping the adhesive remaining part on the tongue 221 in the solvent 243, the head suspension 211 may wholly or partly be dipped in the solvent 243 if conditions allow.

If the solvent 243 is hazardous to the head suspension 211, or if the solvent 243 has a risk of detaching not only the adhesive 227 but also parts such as buffers from the head suspension 211, the solvent 243 is locally applied or dropped with the use of, for example, a sintered ceramic bar 245 onto the part of the tongue 221 where the adhesive 227 is left as illustrated in FIG. 7A. The same may be carried out with the use of a microdispenser 246 as illustrated in FIG. 8A. Thereafter, the adhesive remaining part on the tongue 221 with the solvent 243 applied thereto is heated with a heater 247 (or hot air) as illustrated in FIGS. 7B and 8B.

The step 3 may include wiping the adhesive remaining part of the tongue 221. The wiping may be carried out after the heating step, to expedite the removal of the adhesive 227. This improves the effect of removing the adhesive 227. Wiping the adhesive remaining part of the tongue 221 may be carried out as a separate step.

Figure 9:
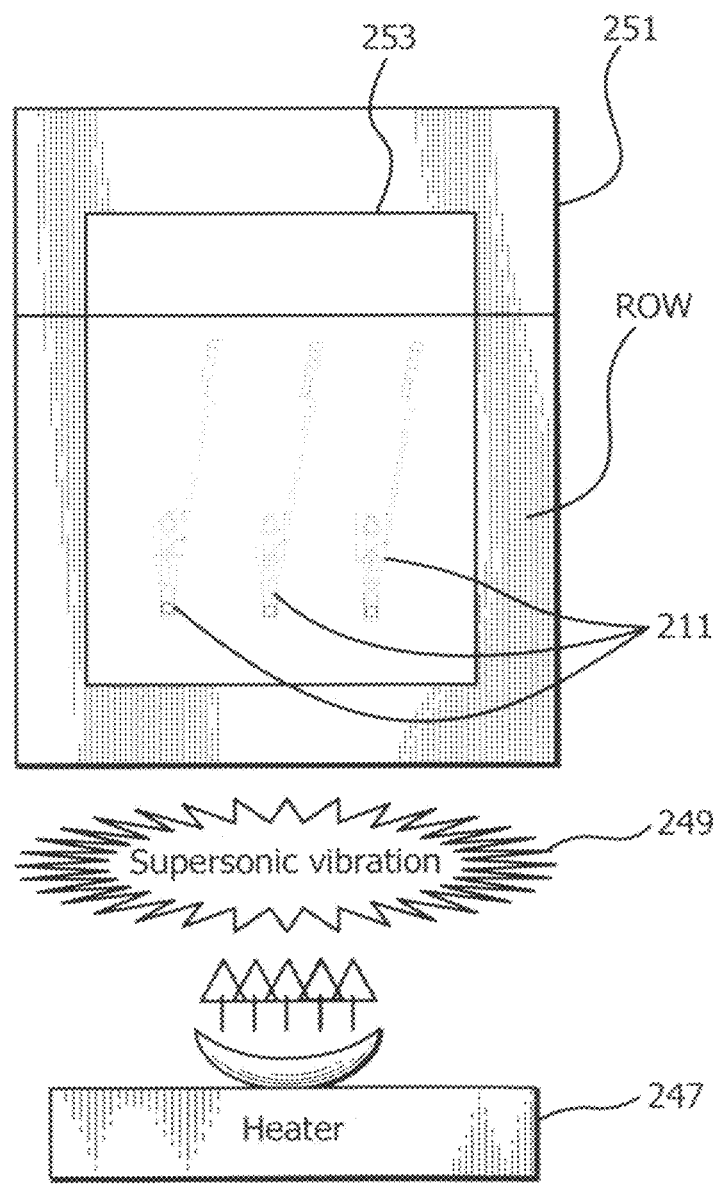
FIG. 9 is a view illustrating a step of washing head suspensions according to an embodiment of the present invention.

The step 4 of washing the head suspension 211 is carried out as illustrated in FIG. 9. A cleaning liquid such as pure water and reverse osmosis water (ROW) is filled in a tank 251. One or a plurality of head suspensions 211 are temporarily fitted to a jig 253 and are immersed in the cleaning liquid. Thereafter, the cleaning liquid is heated with a heater 247, or supersonic vibration is applied by a supersonic vibrator to the head suspension(s) 211, or both the heating and the supersonic vibration are applied to the head suspension(s) 211. The heating is carried out at a predetermined temperature (for example, 200 degrees centigrade) or lower for a predetermined time and the supersonic vibration is carried out at a predetermined frequency.

Before conducting the washing step, the head suspension 211 may preliminarily be rinsed with a cleaning liquid such as pure water, to wash off excessive adhesive and the like.

A method of reclaiming a work according to an embodiment of the present invention will be explained.

The "work" corresponds to the head gimbal assembly of the above-mentioned embodiment. The work has a base (flexure 219) to which an electronic part (slider 225) is fixed with an adhesive 227. The base (flexure 219) has other parts (flexible wiring substrates 229 and 231, buffers, and the like). The work (head gimbal assembly, in particular, head suspension 211) is reclaimed by detaching the electronic part (slider 225) and by removing the adhesive 227 remaining on the base (flexure 219). Removing the remaining adhesive is carried out through a step of feeding a solvent 243, which expedites the removal of the adhesive 227, to the adhesive remaining part and a step of promoting the removal of the adhesive 227 by heating the part where the adhesive 227 remains.

In the solvent feeding step, the solvent 243 may locally be fed to the part of the base (flexure 219) where the adhesive 227 remains.

In the removal promoting step, the part where the adhesive 227 remains is heated in a temperature range (for example, lower than 200 degrees centigrade) that may not pose hazard on the parts (flexible wiring substrates 229 and 231) on the base (flexure 219).

As mentioned above, the method of reclaiming a head suspension according to the embodiment achieves the process of removing an adhesive left on the tongue 221 through the step of feeding the solvent 243 to a part of the tongue 221 where the adhesive 227 is left, the solvent 243 being one that promotes the removal of the remaining adhesive from the tongue 221 and the step of promoting the removal of the remaining adhesive from the tongue 221 by applying physical energy to the part of the tongue 221 where the adhesive 227 remains, the physical energy being produced by heating the part, or by applying supersonic vibration to the part, or by applying a combination thereof to the part. The method is capable of easily removing the adhesive 227 from the tongue 221 without directly applying mechanical force to the tongue 221.

The method poses no hazard such as flaws, deformation, and load variation on the head suspension 211, shortens working hours, and improves yields.

If the solvent 243 is hazardous to the head suspension 211, or if the solvent 243 acts to detach parts such as buffers from the head suspension 211, the method locally applies or drops the solvent 243 with the use of the sintered ceramic bar 245 or the microdispenser 246 onto the part of the tongue 221 where the adhesive 227 is left.

With this, the method can properly remove the adhesive 227 without spreading the solvent 243 to the peripheral area of the adhesive remaining part or without badly affecting the peripheral area.

If the removal promoting step is hazardous to the head suspension 211, or if the removal promoting step causes a change in the characteristics of various parts such as the flexible wiring substrates 229 and 231 of the head suspension 211, the removal promoting step employs a heating temperature (for example, lower than 200 degrees centigrade) or a heating temperature range that is not hazardous to such parts.

With this, the adhesive 227 is properly removed without causing the removal of peripheral parts around the adhesive remaining part during the removal promoting step.

A method of manufacturing a head suspension according to an embodiment of the present invention reclaims the head suspension with the use of the adhesive removing process of the above-mentioned embodiment. This manufacturing method improves the yields of head suspensions and provides high-quality head suspensions at low cost.

The method of reclaiming a work according to the above-mentioned embodiment achieves the process of removing an adhesive 227 left on a base (flexure 219) of the work through the step of feeding a solvent 243, which expedites the removal of the adhesive 227, to a part of the base (flexure 219) where the adhesive 227 remains and the step of promoting the removal of the adhesive 227 by heating the part where the adhesive 227 remains. The method can easily remove the adhesive 227 from the base (flexure 219) of the work without directly applying mechanical force to the base.

The method poses no hazard such as flaws, deformation, and load variation on the work (head suspension 211), shortens working hours, and improves yields.

If the solvent 243 is hazardous to the work (head suspension 211), or if the solvent 243 acts to detach parts such as buffers from the work (head suspension 211), the solvent feeding step locally applies or drops the solvent 243 to the part of the base (flexure 219) where the adhesive 227 is left.

With this, the method can properly remove the adhesive 227 without spreading the solvent to the peripheral area of the adhesive remaining part or without badly affecting the peripheral area.

If the solvent 243 or the removal promoting step is hazardous to the work (head suspension 211) or causes a change in the characteristics of various parts (flexible wiring substrates 229 and 231) of the work (head suspension 211), the removal promoting step employs a heating temperature (for example, lower than 200 degrees centigrade) or a heating temperature range that is not hazardous to such parts.

With this, the adhesive 227 is properly removed without spreading the solvent 243 to the peripheral area of the adhesive remaining part or without badly affecting the peripheral area during the removal promoting step.

The present invention is not limited to the embodiments mentioned above. Various modifications and alterations will be possible based on the above-mentioned embodiments without departing from the spirit and technical idea of the present invention specified in the specification and claims of this document. It is understood that any methods of reclaiming and manufacturing head suspensions and works based on such modifications and alterations fall under the scope of the present invention.

For example, one modification of the present invention may repeat the adhesive removing process (the steps 2 to 4 of FIG. 6) a plurality of times. This modification smoothly and clearly removes an adhesive even if the adhesive is strongly adhering to the tongue 221.

What is claimed is:

1. A method of reclaiming a head suspension from a head gimbal assembly, the head gimbal assembly including the head suspension and a slider, the slider including a read/write magnetic head and being attached with an adhesive to a tongue of the head suspension, the method comprising:
    detaching the slider from the tongue of the head suspension wherein the adhesive remains on part of the tongue and is mainly formed of a thermosetting resin material that forms a network structure when heated; and
    removing the adhesive remaining on the tongue by:
        feeding a solvent to a part of the tongue where the adhesive remains, the solvent being one that promotes the removal of the remaining adhesive from the tongue;
        promoting the removal of the remaining adhesive on the tongue to which the solvent has been fed by subsequently applying, in a single step, both physical energy and supersonic vibration to the adhesive remaining part on the tongue to which the solvent has been fed, the physical energy being produced by heating the adhesive remaining part on the tongue to which the solvent has been fed, and the supersonic vibration vibrating the tongue and the adhesive remaining part on the tongue to which the solvent has been fed at supersonic frequency such that the combined application of the physical energy produced by heating and the supersonic vibration combine in order to promote the removal of the adhesive remaining part on the tongue and thereby to remove the adhesive remaining on the tongue.

2. The method of claim 1, wherein feeding a solvent to a part of the tongue where the adhesive remains includes:
    locally feeding the solvent to the part of the tongue where the adhesive remains.

3. The method of claim 1, wherein promoting the removal of the remaining adhesive from the tongue includes:
    choosing a heating temperature range that poses no hazard on any part of the head suspension and heating the adhesive remaining part at a temperature in the chosen heating temperature range.

4. The method of claim 1, wherein promoting the removal of the remaining adhesive from the tongue includes:
    wiping the adhesive remaining part.

5. The method of claim 1, further comprising;
    washing at least the tongue with a cleaning liquid after promoting the removal of the remaining adhesive from the tongue.

6. The method of claim 5, wherein:
    the cleaning liquid is pure water.

7. The method of claim 5, wherein washing at least the tongue with a cleaning liquid includes:
    immersing at least the tongue in the cleaning liquid filled in a tank and heating the cleaning liquid.

8. The method of claim 5, wherein washing at least the tongue with a cleaning liquid includes:
    immersing at least the tongue in the cleaning liquid filled in a tank and applying supersonic vibration to the tongue.

9. The method of claim 1, wherein feeding a solvent to a part of the tongue where the adhesive remains includes:
    locally feeding the solvent to the adhesive remaining part on the tongue through one of a sintered ceramic bar and a microdispenser.

10. The method of claim 1, wherein promoting the removal of the remaining adhesive from the tongue includes:
    heating the adhesive remaining part on the tongue to which the solvent has been fed at a temperature equal to or lower than 200 degrees centigrade.

11. A method of reclaiming a head suspension from a head gimbal assembly, the head gimbal assembly including the head suspension and a slider, the slider including a read/write magnetic head and being attached with an adhesive to a tongue of the head suspension, the method comprising:
    detaching the slider from the tongue of the head suspension;
    removing the adhesive remaining on the tongue by:
        feeding a solvent to a part of the tongue where the adhesive remains, the solvent being one that promotes the removal of the remaining adhesive from the tongue, and
        promoting the removal of the remaining adhesive from the tongue by applying physical energy to the adhesive remaining part on the tongue, the physical energy being produced by heating; and repeating removing the adhesive remaining on the tongue a plurality of times.

12. A method of manufacturing a head suspension by reclaiming the head suspension according to the method of claim 1.

\* \* \* \* \*